(12) United States Patent
Fessele et al.

(10) Patent No.: US 10,078,028 B2
(45) Date of Patent: Sep. 18, 2018

(54) IODINE-RESISTANT PRESSURE SENSOR ASSEMBLAGE

(71) Applicant: Robert Bosch GmbH, Stuttgart (DE)

(72) Inventors: Thomas Fessele, Nagold (DE); Masoud Habibi, Schwieberdingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 371 days.

(21) Appl. No.: 14/947,059

(22) Filed: Nov. 20, 2015

(65) Prior Publication Data
US 2016/0146688 A1 May 26, 2016

(30) Foreign Application Priority Data

Nov. 25, 2014 (DE) ........................ 10 2014 223 974

(51) Int. Cl.
*G01L 19/06* (2006.01)
*G01L 19/00* (2006.01)
*G01L 19/14* (2006.01)

(52) U.S. Cl.
CPC ...... *G01L 19/0038* (2013.01); *G01L 19/0627* (2013.01); *G01L 19/143* (2013.01)

(58) Field of Classification Search
CPC .................................................. G01L 19/0645

USPC .......................................................... 73/706
See application file for complete search history.

(56) References Cited

U.S. PATENT DOCUMENTS 7,451,653 B1 * 11/2008 Sippola ................. G01L 9/0042
73/715

FOREIGN PATENT DOCUMENTS

EP          1 521 952       4/2005

* cited by examiner

*Primary Examiner* — Walter L Lindsay, Jr.
*Assistant Examiner* — Philip Marcus T Fadul
(74) *Attorney, Agent, or Firm* — Norton Rose Fulbright US LLP; Gerard Messina

(57) ABSTRACT

A pressure sensor assemblage includes a housing and a pressure sensor received in an interior space of the housing. The housing has at least one gas inlet that is connected in gas-permeable fashion at least to a sub-region of the interior space of the housing. In addition, a sacrificial element is provided at the gas inlet, which element is disposed and implemented in such a way that gas flowing through the gas inlet comes into contact with a surface of the sacrificial element, which surface of the sacrificial element is provided with a silver layer. The sacrificial element has a carrier element made of an iodine- or iodide-resistant material.

9 Claims, 4 Drawing Sheets

IODINE-RESISTANT PRESSURE SENSOR ASSEMBLAGE

BACKGROUND OF THE INVENTION

1. Field of the Invention

The present invention relates to a pressure sensor assemblage that can be used in particular in motor vehicles.

2. Description of the Related Art

Pressure sensors can be used to measure gas pressures in systems. For example, a gas pressure inside a gas-conveying or gas-containing system can be measured, absolutely or relative to a reference pressure, with the aid of a pressure sensor. Alternatively, two gas pressures can be measured relative to one another, for example at different locations in a gas-conveying or gas-containing system. In the latter case the term "differential pressure sensor" is also used.

Pressure sensor assemblages are used in motor vehicles, inter alia, in order to sense an absolute intake manifold pressure in Otto-cycle or turbodiesel engines. Such pressure sensor assemblages are also referred to as "manifold absolute pressure" (MAP) sensors. Alternatively, for example, a differential pressure assemblage can be used in a motor vehicle in order to identify a degree of contamination in a diesel particle filter, based on a gas pressure existing in an inflow to the filter relative to a gas pressure existing in an outflow.

Pressure sensors nowadays are usually implemented as micromechanical components, and generally have a detection surface that is designed to modify its physical properties as a function of pressures acting on it. The detection surface can be implemented, for example, as a thin membrane that deforms upon the impingement of pressure. Changes in physical parameters which occur as a result of the deformation can be measured, for example, by way of an integrated circuit, and then outputted as a signal that carries information regarding the prevailing gas pressure.

European Patent EP 1 521 952 B1 describes an apparatus for pressure measurement that is suitable for pressure measurement, in particular for differential pressure measurement, in motor vehicles.

In order for the detection surface of the pressure sensor to be able to sense the pressure, requiring measurement, of a gas in a system, a gas-permeable connection should exist between the system and a volume adjacent to the detection surface. A change in pressure in the system can then, by gas exchange, bring about a modified pressure on the detection surface.

Penetration of substances into a housing surrounding the micromechanical pressure sensor can, however, also occur through the gas-permeable connection. In particular, substances that can damage the pressure sensor can be contained in the gas whose pressure is to be measured.

It has been observed, for example, that iodine or iodide that arrives at the pressure sensor can, for example, damage contacts there. Iodine or iodide can, for example, be released over time from the material of supply conduits that lead to the pressure sensor assemblage.

Efforts have previously been made to protect the components that are sensitive to penetrating damaging substances, for example, with a cover layer made of less-sensitive material such as gold.

In an alternative approach to a solution, so-called "sacrificial" structures are used; these bind by chemical reactions to the potentially damaging substances that penetrate, but are themselves consumed in the process. Sacrificial structures made of loose silver wool or silver wire, for example, can be used to bind penetrating iodine.

BRIEF SUMMARY OF THE INVENTION

Embodiments of the present invention can advantageously make possible a pressure sensor assemblage that is largely resistant to iodine or iodide contained in an inflowing gas, is simple and economical to manufacture, and is robust over the long term.

A pressure sensor assemblage, which has a housing and a pressure sensor received in an interior space of the housing, is proposed according to a first aspect of the invention. The housing has at least one gas inlet that is connected in gas-permeable fashion to the interior space of the housing. The pressure sensor device is notable for the fact that a sacrificial element is provided at the gas inlet, which element is disposed and implemented in such a way that gas flowing through the gas inlet comes into contact with a surface of the sacrificial element. The surface of the sacrificial element is equipped with a silver layer.

Ideas regarding embodiments of the present invention can be regarded, inter alia, as being based on the concepts and findings described below.

As noted previously, it has been observed that, in particular, iodine or iodide that comes into contact with a micromechanical component of a pressure sensor assemblage can result in damage to structures of the component or to its contacts. Previous approaches to avoiding such damage have in the meantime often been recognized to be disadvantageous.

For example, the processing of materials that form a resistant protective layer, in particular gold, can result in problems with the processing technologies used to manufacture micromechanical components. It has been observed in particular that deposition of gold layers is usually undesirable in the semiconductor industry because, for example, gold remaining behind in a production facility can result, upon subsequent production of other components (such as transistors), in undesired influence on the threshold voltage therein.

Alternatively utilized sacrificial structures, made e.g. of silver wool or silver wire, have in some cases turned out not to be robust over the long term. It has been observed, for example, that consumption of silver due to reactions with iodine or iodide, or as a result of corrosion, can cause the formation of particles that can then, for example, travel into a combustion chamber of an internal combustion engine and cause damage therein.

It is therefore proposed to provide a pressure sensor assemblage having an alternative sacrificial structure. In this case the sacrificial structure is to be provided as a sacrificial element that is disposed at the gas inlet into the housing of the sensor assemblage. The sacrificial element is equipped on its surface with a layer of silver which can act as a sacrificial layer.

The sacrificial element is preferably implemented as a solid structure that is equipped only on its surface with a silver layer.

The sacrificial element can be implemented, for example, with a carrier element onto which the silver layer is then applied. The carrier element should preferably be implemented with a material, or be made of a material, that does not react chemically with iodine or iodide, i.e. that is resistant to iodine or iodide, and that thus, for example, is not consumed by chemical reactions with iodine or iodide. What can be achieved thereby is that the silver layer that serves as an actual sacrificial structure is held on the carrier element that is not itself consumed by chemical reactions over the course of time. Long-term robustness of the sacrificial element can thereby be achieved. In particular, formation of loose particles upon increasing decomposition of the sacrificial silver can be avoided.

The carrier layer can be implemented, for example, with steel sheet. Steel sheet is both mechanically stable and largely chemically resistant to iodine or iodide.

The sacrificial element can, in particular, be integral. The sacrificial element can have, for example, a sleeve-like geometry. In other words, the sacrificial element can be implemented, for example, with an open or closed ring shape. The sacrificial element can in particular be of cylindrical configuration. The sacrificial element can have on one side an interruption or a slit so that its outer periphery can be deformed.

The sacrificial element can be secured on an inner surface of the gas inlet by frictional engagement, intermaterial connection, and/or positive engagement. For example, the sacrificial element can have an outer contour that substantially corresponds to an inner contour on the inner surface of the gas inlet, or is slightly larger than it. The sacrificial element can then be pressed by frictional engagement into the gas inlet. Intermaterial adhesive bonding of the sacrificial element in the gas inlet is also possible. The sacrificial element can furthermore, for example, be equipped with snap lugs with which it can be latchingly secured in positively engaged fashion in a fitting that forms the gas inlet.

Alternatively, the sacrificial element can be insert-molded into a fitting that forms the gas inlet. The fitting, or the entire housing including the fitting, can be produced, for example, by injection molding of an injection moldable material such as a thermoplastic, the sacrificial element being secured on the gas inlet of the housing by being insert-molded into the fitting.

Preferably the entire surface of the sacrificial element is equipped with the silver layer. Coating of the entire surface is simple to carry out in technical terms, for example by electroplating or CVD methods. In principle, however, it can also be sufficient to equip only sub-regions of the surface of the sacrificial element with silver.

The silver layer can preferably have a layer thickness of between 1 and 100 μm, more preferably between 5 and 20 μm. This layer thickness seems sufficient to serve as a sacrificial layer over the entire planned service life of the pressure sensor assemblage.

Be it noted that some of the possible features and advantages of the invention are described herein with reference to different embodiments. One skilled in the art recognizes that the features can be appropriately combined, adapted, or exchanged in order to arrive at further embodiments of the invention.

DETAILED DESCRIPTION OF THE INVENTION

Figure 1:
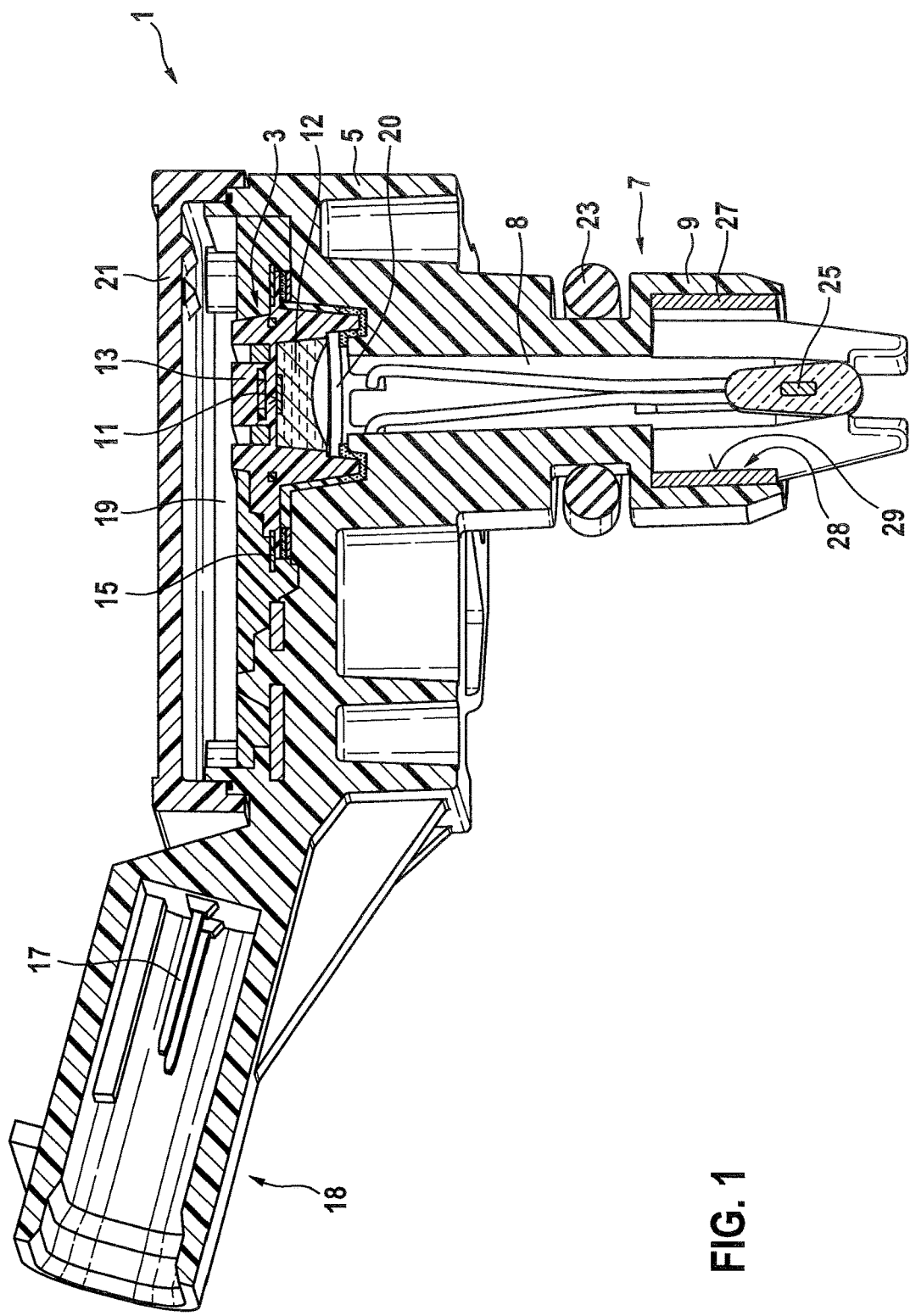
FIG. 1 is a perspective section view of a pressure sensor assemblage according to the present invention.

Embodiments of the invention are described below with reference to the accompanying drawings; neither the drawings nor the description are to be construed as limiting the invention.

The Figures are merely schematic and not to scale. Identical reference characters in the Figures designate identical or identically functioning features.

FIG. 1 illustrates a configuration of a pressure sensor assemblage 1 according to the present invention.

Pressure sensor assemblage 1 has a pressure sensor 3 as well as a housing 5 that, in the installed state, surrounds pressure sensor 3. Pressure sensor 3 is disposed in an interior space 19 surrounded by housing 5 and by a cover 21. A gas inlet 7, in the form of a hollow cylindrical fitting 9 projecting downward out of housing 5, is provided on the housing. Pressure sensor 3 can be configured with a micromechanical component 13. It has a detection surface 11 whose properties change measurably upon impingement of pressure. The detection surface can be protected by a flexible gel 12. Pressure sensor 3 has molded-in contactable inserted parts 15 that are connected from the outside, via bond contacts (not depicted), to external contacts 17. External contacts 17 are received in a socket 18 so that pressure sensor 3 can be contacted from outside by way of a plug connector (not depicted).

Gas can penetrate from outside via gas inlet 7 into a sub-region 20 of interior space 19. Gas inlet 7 is configured in such a way that gas penetrating via gas inlet 7 can travel to detection surface 11 of the pressure sensor. Gas inlet 7 can be connected, for example, to an intake manifold of an internal combustion engine of a motor vehicle, so that the pressure sensor assemblage can be used to identify a current pressure in the intake manifold.

Alternatively, the pressure sensor assemblage can also have two separate gas inlets that can be connected, for example, to different regions of a gas-conveying system (not depicted) so that a relative pressure difference between those regions can be identified with the aid of the pressure sensor. The pressure sensor assemblage can thus be used, for example, as a differential pressure sensor assemblage in an exhaust system of a motor vehicle, in order to identify a gas pressure in the exhaust system at a position upstream from a particle filter in relation to a gas pressure in the exhaust system downstream from the particle filter. Conclusions can be drawn from this information as to a degree of contamination of the particle filter.

Fitting 9 of gas inlet 7 surrounds a conduit 8 through which gas can flow into and out of sub-region 20 of interior space 19 of housing 5. Sub-region 20 of interior space 19 can thus be gas-permeably connected, via conduit 8, with a gas-conveying or gas-containing system attached to fitting 9 via gas-conveying lines (not depicted), and can thus measure a gas pressure existing in that system. A peripheral seal 23 is provided on fitting 9 in order to allow the gas-conveying lines to be attached in gas-tight fashion to pressure sensor assemblage 1. Also provided in the example depicted is a temperature measurement sensor 25, in the form of a negative temperature coefficient thermistor (NTC), extending through conduit 8.

It has been observed that iodine or iodide, which for example can emerge over time from the gas-conveying lines, can have a damaging effect when it comes into contact, for example, with micromechanical pressure sensor 3 or with its electrical contacts. For example, it has been noted that iodide can be leached out of components of a secondary air system, for example, in the form of copper iodide (CuI) or potassium iodide (KI). The iodide can be oxidized to iodine ($I_2$) by oxidizing agents such as nitrogen oxides ($NO_2$). Iodine can cause corrosion of an intermetallic phase $Au_xAl_y$ at bond contacts of pressure sensor 3, at which thin gold wires are typically bonded onto aluminum pads, with the result that local weakening of the strength of the bond contact, and ultimately failure thereof, can occur, for example due to detachment of the bond under thermomechanical loads. The corrosion occurs here due to a catalytic process, so that no iodine is consumed.

In order to prevent iodine from being able to travel into interior space 19 and in particular into sub-region 20 thereof, and to the bond contacts therein, provision is now made to provide in the region of gas inlet 7 a sacrificial element 27 on which a silver layer is superficially applied. A surface 29 of sacrificial element 27 directed toward conduit 8 is exposed and can come into contact with gas flowing to pressure sensor 3. Silver in this silver layer can react chemically with iodine or iodide contained in the gas, and thereby bind it.

Figure 2:
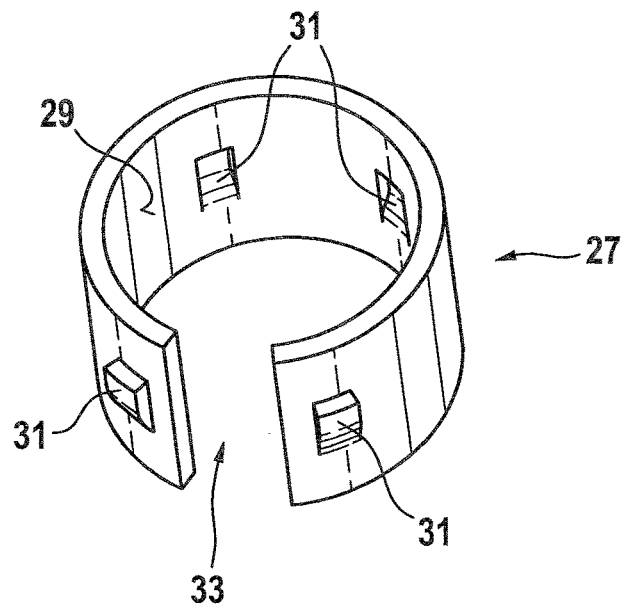
FIG. 2 is a perspective view of a sacrificial element for a pressure sensor assemblage according to the present invention.
Figure 3:
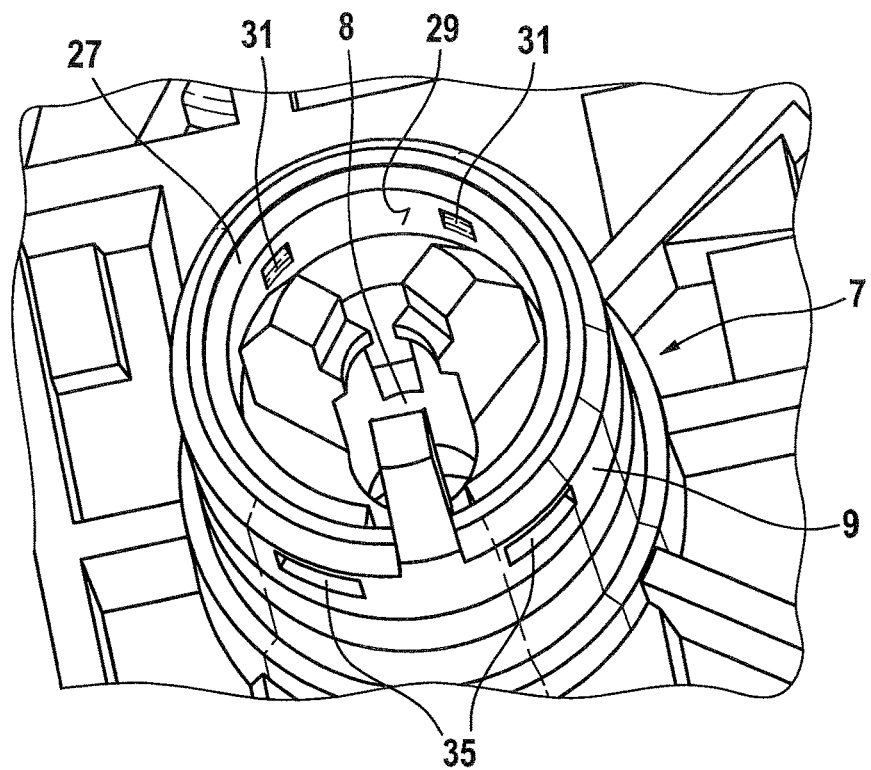
FIG. 3 is a perspective plan view of a gas inlet of a pressure sensor assemblage according to the present invention having a sacrificial element secured therein.
Figure 4:
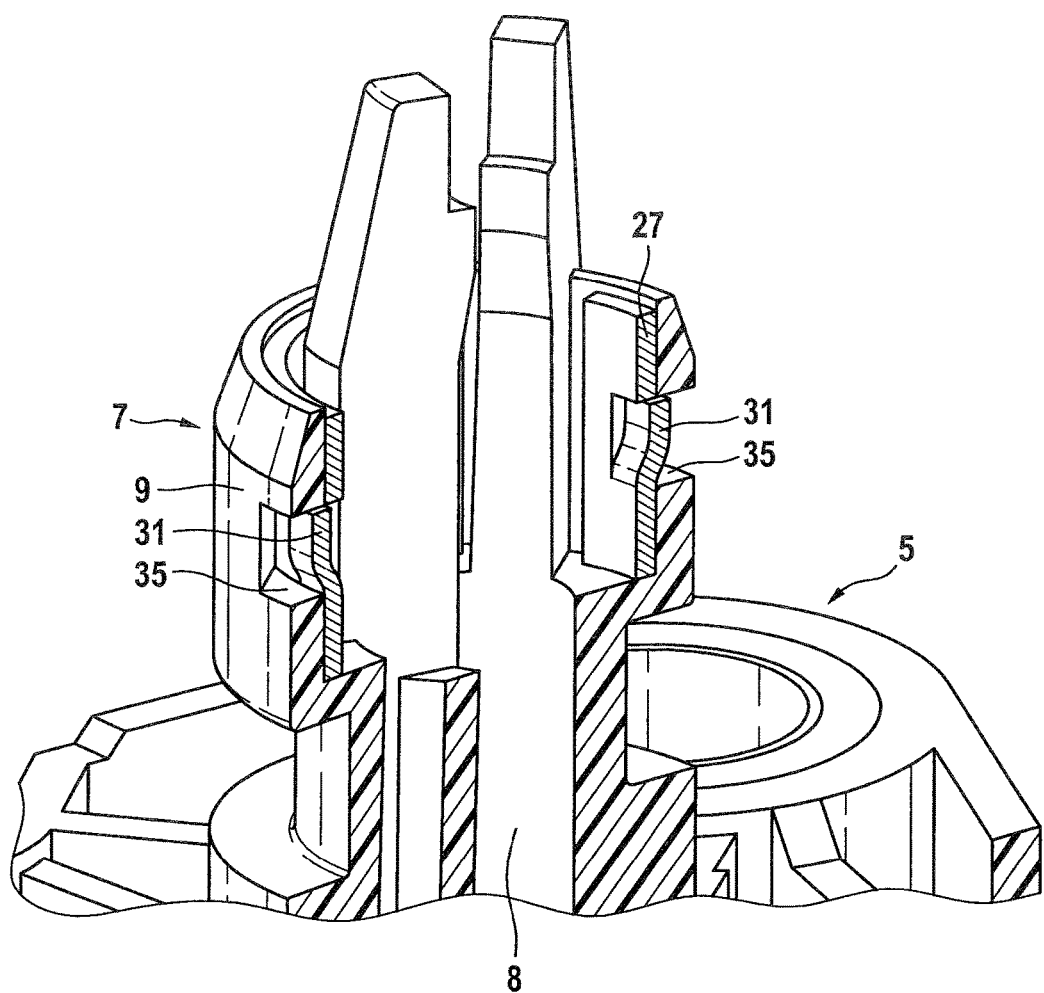
FIG. 4 is a perspective section view through a gas inlet of a pressure sensor assemblage according to the present invention having a sacrificial element secured therein.
Figure 6:
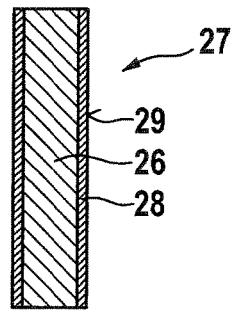
FIG. 6 is a section view through a sacrificial element for a pressure sensor assemblage according to the present invention.

FIG. 2 illustrates an example of a sacrificial element 27. FIG. 6 is a cross section through a sacrificial element of this kind. FIGS. 3 and 4 illustrate the manner in which the sacrificial element can be disposed and fastened on fitting 9 of gas inlet 7.

The exemplifying sacrificial element 27 has a sleeve-like geometry. For that purpose, sacrificial element 27 is of cylindrical configuration and has a slit 33 along its longitudinal dimension. Thanks to slit 33, sacrificial element 27 can be compressed so that it can be installed, for example, in fitting 9. Also provided on sacrificial element 27 are snap lugs 31 with which sacrificial element 27 can engage into correspondingly fitted recesses 35 on fitting 9. For installation, sacrificial element 27 can thus be pressed into conduit 8 in fitting 9 and can then latch positively, with its snap lugs 31, into recesses 35 provided therein.

As is evident from FIG. 6, sacrificial element 27 has a carrier element 26 that imparts to the sacrificial element, inter alia, its mechanical stability. Carrier element 26 can be formed, for example, by rolling a metal sheet, in particular a steel sheet. Carrier element 26 can have, for example, a thickness of between 0.1 and 5 mm, preferably between 0.2 and 1 mm. A thin silver layer 28 of between 1 and 100 µm, for example between 5 and 10 µm, is applied onto an external surface 29 of carrier element 26.

Figure 5:
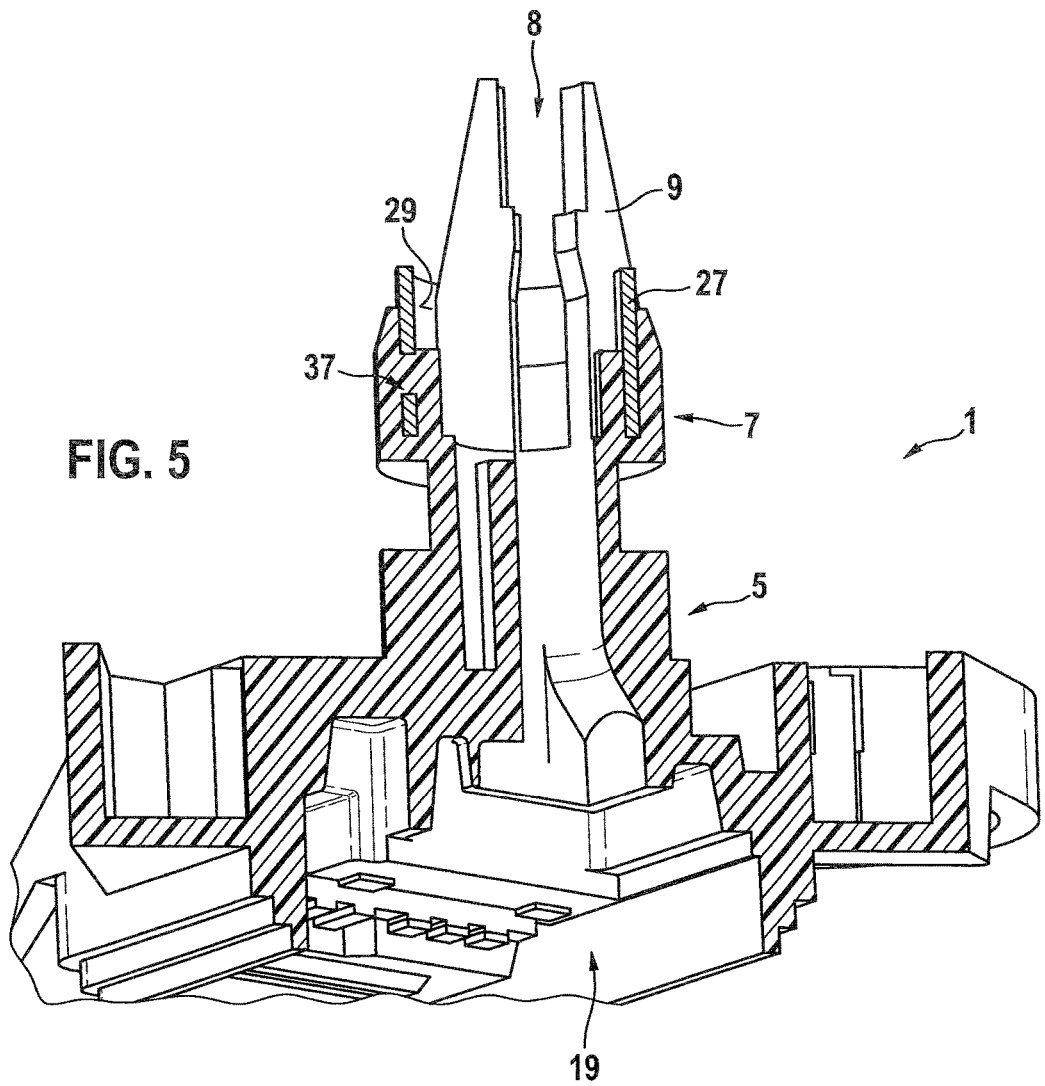
FIG. 5 is a perspective section view through a gas inlet of a further pressure sensor assemblage according to the present invention having a sacrificial element insert-molded thereinto.

FIG. 5 shows an alternative configuration of a housing 5 of a pressure sensor assemblage 1. In this case sacrificial element 27 is concurrently insert-molded directly into housing 5. Holes 37 are provided locally in the sleeve of sacrificial element 27. Upon injection molding of housing 5, simultaneously with the insert-molding of sacrificial element 27, plastic of housing 5 can flow into holes 37 so that once the plastic cures, sacrificial element 27 is immovably anchored in housing 5. An internal surface 29 of the sacrificial element, facing toward conduit 8, is once again exposed, so that silver layer 28 provided there can come into contact with gas flowing through.

With pressure sensor assemblage 1 proposed here, penetration of iodine or iodide into housing 5, and thus damage to bond contacts received therein, can be prevented with relatively simple means. Sacrificial element 27 provided for this purpose can be manufactured, and integrated into pressure sensor assemblage 1, in simple fashion. The proposed economical approach can furthermore make it possible to dispense with gold-plating processes such as those previously used in some cases to protect bond contacts. Contamination with silver parts as a consequence of corrosion phenomena on the sacrificial structure can also be prevented. A high degree of flexibility results from integration of the robustness feature into housing 5 of pressure sensor assemblage 1.

In conclusion, it is to be noted that terms such as "having," "encompassing," etc. do not exclude any other elements or steps, and terms such as "a" or "an" or "one" do not exclude a plurality. Be it noted further that features or steps that have been described with reference to one of the above exemplifying embodiments can also be used in combination with other features or steps of other exemplifying embodiments described above. Reference numbers in the claims are not to be regarded as a limitation.

What is claimed is:

1. A pressure sensor assemblage, comprising:
   a housing; and
   a pressure sensor received in an interior space of the housing;
   wherein the housing has at least one gas inlet connected in gas-permeable fashion to at least a sub-region of the interior space of the housing, and wherein a sacrificial element is provided at the gas inlet in such a way that gas flowing through the gas inlet comes into contact with a surface of the sacrificial element, the surface of the sacrificial element being provided with a silver layer,
   wherein the sacrificial element has a sleeve-like geometry.

2. The pressure sensor assemblage as recited in claim 1, wherein the sacrificial element includes a carrier element containing a material which does not react chemically with iodine or iodide, and the silver layer is applied onto a surface of the carrier element.

3. The pressure sensor assemblage as recited in claim 2, wherein the carrier element configured as a steel sheet.

4. The pressure sensor assemblage as recited in claim 2, wherein the sacrificial element has a sleeve-like geometry.

5. The pressure sensor assemblage as recited in claim 2, wherein the sacrificial element is secured on an inner surface of the gas inlet by at least one of frictional engagement, intermaterial connection, and positive engagement.

6. The pressure sensor assemblage as recited in claim 5, wherein the sacrificial element is latchingly secured by snap lugs in a fitting which forms the gas inlet.

7. The pressure sensor assemblage as recited in claim 5, wherein the sacrificial element is insert-molded into a fitting which forms the gas inlet.

8. The pressure sensor assemblage as recited in claim 2, wherein the entire surface of the sacrificial element is provided with the silver layer.

9. The pressure sensor assemblage as recited in claim 8, wherein the silver layer has a layer thickness of between 5 and 20 µm.

* * * * *